(12) United States Patent
Ichiba et al.

(10) Patent No.: US 7,518,428 B2
(45) Date of Patent: Apr. 14, 2009

(54) PHASE COMPENSATION CIRCUIT AND POWER CIRCUIT HAVING SAME

(75) Inventors: Kouji Ichiba, Chuo-ku (JP); Takeshi Naka, Chuo-ku (JP)

(73) Assignees: Torex Semiconductor Ltd., Tokyo (JP); Device Engineering Co., Ltd., Tokyo (JP)

( * ) Notice: Subject to any disclaimer, the term of this patent is extended or adjusted under 35 U.S.C. 154(b) by 351 days.

(21) Appl. No.: 11/221,719

(22) Filed: Sep. 9, 2005

(65) Prior Publication Data

US 2007/0174017 A1     Jul. 26, 2007

(30) Foreign Application Priority Data

Sep. 9, 2004    (JP)    ............................. 2004-262599
Sep. 5, 2005    (JP)    ............................. 2005-256623

(51) Int. Cl.
*H03H 11/16*    (2006.01)
*H03K 5/13*    (2006.01)

(52) U.S. Cl. .................. 327/223; 327/552; 330/302

(58) Field of Classification Search .................. 327/233, 327/552, 553, 557–559; 330/260, 278, 302, 330/303

See application file for complete search history.

(56) References Cited

U.S. PATENT DOCUMENTS 5,382,918 A    1/1995    Yamatake
6,518,737 B1 *    2/2003    Stanescu et al. ............. 323/280

FOREIGN PATENT DOCUMENTS

| JP | 62-188513 A | 8/1987 |
| JP | 04-104504 A | 4/1992 |
| JP | 04-248707 A | 9/1992 |
| JP | 07-007382 A | 1/1995 |
| JP | 2003-037449 A | 2/2003 |

* cited by examiner

*Primary Examiner*—Tuan T Lam
*Assistant Examiner*—Diana J Cheng
(74) *Attorney, Agent, or Firm*—Sughrue Mion, PLLC

(57) ABSTRACT

In a phase compensation circuit having a resistance connected to the output side of an error amplifier, a capacitor, and a conductance amplifier functioning as a capacitance amplifier circuit, capacitance is amplified by the conductance amplifier and used, whereby an essentially required capacitance is ensured, even when the capacitance of the capacitor is small.

4 Claims, 7 Drawing Sheets

PHASE COMPENSATION CIRCUIT AND POWER CIRCUIT HAVING SAME

BACKGROUND OF THE INVENTION

1. Field of the Invention

This invention relates to a phase compensation circuit, and a power circuit having it. More specifically, the invention relates to those useful when applied to a power circuit for making phase compensation for a feedback system using an error amplifier, such as a DC-DC converter.

2. Description of the Related Art

FIG. 1 is a block diagram showing the whole of a step-down DC-DC converter, which is one of representative power circuits. As shown in the drawing, an error amplifier 1 makes a comparison between a reference voltage VREF, which represents a preset voltage value, and a feedback signal FB, and delivers an error signal S1 which represents a deviation between VREF and FB. The feedback signal FB is obtained by dividing an output voltage VOUT by feedback resistances Rf1 and Rf2.

A comparator 2 compares the error signal S1 with an output signal S2 of a circuit 3, which generates a triangular wave, and sends out a duty signal S3 representing a duty ratio which determines the value of the output voltage VOUT of the DC-DC converter, namely, an output voltage value. The duty signal S3 controls the ON-OFF times of a P-channel MOS transistor P1 and an N-channel MOS transistor N1 via an output buffer circuit 6. This control defines the value of the output voltage VOUT based on an input voltage VIN. A reactance L0 and a capacitor C0 function to smooth the output voltage VOUT.

In such a feedback system using the error amplifier 1, a phase compensation circuit 7 is usually present for making phase compensation.

A concrete configurational example of the phase compensation circuit 7 concerned with prior art is shown in FIG. 2. As shown in this drawing, the phase compensation circuit 7 consists of a resistance R1 and a capacitor C connected in series, and is connected to the output side of the error amplifier 1. FIG. 3 is a Bode's diagram in this case.

In the case of the DC-DC converter, management of a gain Az of the circuit shown in FIG. 2 is very important. That is, a zero point (a point at which the phase returns by 45 degrees; a frequency at this point is taken as a zero-point frequency fz (in the vicinity of 5 KHz in FIG. 3)) for phase compensation is created by the capacitor C and the resistance R1 of the phase compensation circuit 7, as shown in FIG. 3, to return the phase. In the region of several hundred Hz to several hundred kHz, a lag in the phase based on the reactance L0 and capacitor C0 for smoothing normally occurs. If the gain Az is large in this region, therefore, oscillations are apt to take place, inducing instability of actions. If the gain Az is too small, on the other hand, response characteristics deteriorate. Hence, it is of vital importance to control the value of the gain Az, especially, the value in the above-mentioned region, to a predetermined range with high accuracy.

The gain Az can be calculated as follows:

$$Az = gm1 \times R1 \quad (1)$$

where gm1 denotes the transconductance of the error amplifier 1, and R1 denotes the resistance value of the resistance R1.

The larger the value of the transconductance gm1, the greater the total gain of the error amplifier 1, and the better the output voltage accuracy and the load regulation become.

If the transconductance gm1 is increased, with the gain Az being controlled to a certain value (e.g., 14 dB), the resistance value R1 is naturally decreased as seen from the equation (1).

Moreover, the zero point for phase compensation at the certain frequency is created by the capacitor C and the resistance R1. Let the frequency for this zero point (the point at which the phase returns by 45 degrees) be fz. In this case, the zero-point frequency fz can be calculated as follows:

$$fz = 1/(2 \times \pi \times C \times R1) \quad (2)$$

Hence, if the value of the transconductance gm1 is increased, and the resistance R1 is decreased, then the capacitor C has to be rendered great in order to create the zero-point frequency fz at a certain fixed point. This poses an areal problem encountered when arranging the capacitor C on a silicon substrate, namely, the problem that the footprint of the capacitor C (namely, an area occupied by the capacitor C) on an IC chip is large.

There is U.S. Pat. No. 5,382,918 as a document which discloses a technology for decreasing the area occupied by the capacitor for phase compensation. This technology is shown in FIG. 4. As shown in this drawing, a phase compensation circuit 01 is connected to the side of an output terminal 03 of an error amplifier 02, which is a gm Amp, to create a zero point, thereby increasing a phase margin. The phase compensation circuit 01 is to be basically composed of a resistance 04 and a capacitor 05 connected in series. However, the function of the capacitor 05 is taken up by an operational amplifier 06, whereby the capacitor 05 is removed to decrease the footprint of the phase compensation circuit 01 as compared with the use of the capacitor 05.

The use of the capacitance value of-electrostatic capacity or capacitance after AC conversion is already available as one of techniques on a GIC (generalized impedance converter) circuit (see, for example, Transistor Technology SPECIAL No. 44, Special Issue, Design of Filters, pp. 100-103).

Therefore, the following documents can be named as documents on publicly known technologies relevant to the present invention:

U.S. Pat. No. 5,382,918 (Patent Document 1)

Transistor Technology SPECIAL No. 44, Special Issue, Design of Filters, pp. 100-103 (Non-patent Document 1)

As stated above, when phase compensation is to be made for a feedback system using an error amplifier, such as a DC-DC converter, the capacitance value of the capacitor C used is never low if the actual layout is considered. In some cases, the capacitance value has become a factor imposing restrictions on the characteristics of IC owing to the layout area.

SUMMARY OF THE INVENTION

The present invention has been accomplished in light of the above-described problems with the earlier technologies. It is an object of the present invention to provide a phase compensation circuit, which uses a capacitor with smaller capacitance than essentially required, to show functions equivalent to those obtained by the required capacitance, can reduce the footprint of the capacitor, can render the controllability of phase characteristics satisfactory, and can ensure a greater phase margin; and a power circuit having the phase compensation circuit.

A first aspect of the present invention, intended to attain the above object, is a phase compensation circuit connected to an output side of an error amplifier, and comprising:

a resistance;

a capacitor; and a conductance amplifier functioning as a capacitance amplifier circuit.

A second aspect of the invention is a phase compensation circuit connected to an output side of an error amplifier, and comprising:
 a resistance;
 a capacitor; and
 a conductance amplifier functioning as a capacitance amplifier circuit, and
 wherein a gain of a system including the error amplifier and the phase compensation circuit is defined by a transistor size ratio of transistors constituting the error amplifier composed of a conductance amplifier and the conductance amplifier of the phase compensation circuit, and a resistance ratio between a resistance defining a bias current of the error amplifier and the resistance of the phase compensation circuit.

A third aspect of the invention is a phase compensation circuit connected to an output side of an error amplifier, and comprising:
 a resistance;
 a capacitor; and
 a conductance amplifier functioning as a capacitance amplifier circuit, and
 wherein a capacitor is combined with the conductance amplifier of the phase compensation circuit in order to increase a phase margin of a system including the error amplifier and the phase compensation circuit.

A fourth aspect of the invention is a phase compensation circuit connected to an output side of an error amplifier, and comprising:
 a resistance;
 a capacitor; and
 a conductance amplifier functioning as a capacitance amplifier circuit, and
 wherein a gain of a system including the error amplifier and the phase compensation circuit is defined by a transistor size ratio of transistors constituting the error amplifier composed of a conductance amplifier and the conductance amplifier of the phase compensation circuit, and a resistance ratio between a resistance defining a bias current of the error amplifier and the resistance of the phase compensation circuit, and
 a capacitor is combined with the conductance amplifier of the phase compensation circuit in order to increase a phase margin of the system including the error amplifier and the phase compensation circuit.

A fifth aspect of the invention is a power circuit having an error amplifier for giving feedback on a signal representing an output voltage, comparing the signal with a predetermined reference value, and sending out a signal corresponding to an error between the signal and the predetermined reference value, and which exercises control such that an output voltage takes a predetermined value in response to an output signal of the error amplifier, and
 comprising, for phase compensation of the error amplifier, a phase compensation circuit
 which is connected to an output side of the error amplifier, and
 which includes a resistance, a capacitor, and a conductance amplifier functioning as a capacitance amplifier circuit.

A sixth aspect of the invention is a power circuit having an error amplifier for giving feedback on a signal representing an output voltage, comparing the signal with a predetermined reference value, and sending out a signal corresponding to an error between the signal and the predetermined reference value, and which exercises control such that an output voltage takes a predetermined value in response to an output signal of the error amplifier, and
 comprising, for phase compensation of the error amplifier, a phase compensation circuit
 which is connected to an output side of the error amplifier,
 which includes a resistance, a capacitor, and a conductance amplifier functioning as a capacitance amplifier circuit, and
 in which a gain of a system including the error amplifier and the phase compensation circuit is defined by a transistor size ratio of transistors constituting the error amplifier composed of a conductance amplifier and the conductance amplifier of the phase compensation circuit, and a resistance ratio between a resistance defining a bias current of the error amplifier and the resistance of the phase compensation circuit.

A seventh aspect of the invention is a power circuit having an error amplifier for giving feedback on a signal representing an output voltage, comparing the signal with a predetermined reference value, and sending out a signal corresponding to an error between the signal and the predetermined reference value, and which exercises control such that an output voltage takes a predetermined value in response to an output signal of the error amplifier, and
 comprising, for phase compensation of the error amplifier, a phase compensation circuit
 which is connected to an output side of the error amplifier,
 which includes a resistance, a capacitor, and a conductance amplifier functioning as a capacitance amplifier circuit, and
 in which a capacitor is combined with the conductance amplifier of the phase compensation circuit in order to increase a phase margin of a system including the error amplifier and the phase compensation circuit.

An eighth aspect of the invention is a power circuit which has an error amplifier for giving feedback on a signal representing an output voltage, comparing the signal with a predetermined reference value, and sending out a signal corresponding to an error between the signal and the predetermined reference value, and which exercises control such that an output voltage takes a predetermined value in response to an output signal of the error amplifier, and
 comprising, for phase compensation of the error amplifier, a phase compensation circuit
 which is connected to an output side of the error amplifier,
 which includes a resistance, a capacitor, and a conductance amplifier functioning as a capacitance amplifier circuit,
 in which a gain of a system including the error amplifier and the phase compensation circuit is defined by a transistor size ratio of transistors constituting the error amplifier composed of a conductance amplifier and the conductance amplifier of the phase compensation circuit, and a resistance ratio between a resistance defining a bias current of the error amplifier and the resistance of the phase compensation circuit, and
 in which a capacitor is combined with the conductance amplifier of the phase compensation circuit in order to increase a phase margin of the system including the error amplifier and the phase compensation circuit.

According to the present invention described above, a smaller capacitance than the essentially required capacitance can be amplified and used. Thus, the footprint of the capacitor of the phase compensation circuit can be reduced and, accordingly, the devices can be arranged rationally. As a result, downsizing of the power circuit, such as a DC-DC converter, which has the phase compensation circuit as a constituent element, can be achieved.

Moreover, the frequency characteristics of the error amplifier can be managed with high controllability. That is, the gain characteristics of the error amplifier can be determined by a resistance ratio and a transistor size ratio by managing the transconductance with high accuracy. By this measure, phase characteristics stable to process variations can be achieved.

Furthermore, in achieving the above-described phase compensation, a mere combination of capacitance and the conductance amplifier used can provide a greater phase margin and, accordingly, a more stable phase compensation can be made.

BRIEF DESCRIPTION OF THE DRAWINGS

For a more complete understanding of the present invention and the advantages thereof, reference is now made to the following descriptions in conjunction with the accompanying drawings.

FIGS. 7A and 7B are views showing an example in which a capacitance is arranged on a silicon substrate with the use of an MOS transistor, in which FIG. 7A is a schematic view of an NMOS capacitance, and FIG. 7B is a view showing its equivalent circuit.

DETAILED DESCRIPTION OF THE INVENTION

An embodiment of the present invention will now be described in detail with reference to the accompanying drawings. The same portions as those in FIG. 2 will be assigned the same numerals and symbols as those in FIG. 2, and duplicate explanations will be omitted.

Figure 5:
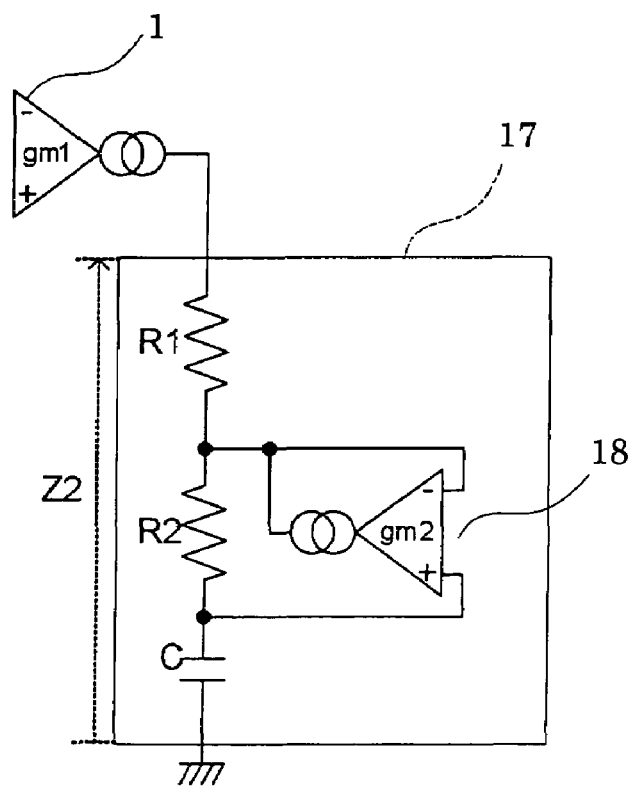
FIG. 5 is a circuit diagram showing a phase compensation circuit according to an embodiment of the present invention.

As shown in FIG. 5, a phase compensation circuit 17 according to the present embodiment has resistances R1, R2 and a capacitor C connected in series, and a conductance amplifier 18 having as an input a voltage across the resistance R2, and is connected to the output side of an error amplifier 1. Such a combination of the error amplifier 1 and the conductance amplifier 18 shows AC characteristics as if the capacitor C had a greater capacitance value than its essential value. A detailed description will be offered in this connection.

The phase characteristics of the phase compensation circuit 7 related to the prior art shown in FIG. 2, and the phase characteristics of the phase compensation circuit 17 shown in FIG. 5 will be calculated below. For simplicity, however, the transconductances gm1 and gm2 of the error amplifier 1 and the conductance amplifier 18 are rendered constant with respect to frequency.

In connection with the phase compensation circuit 7 according to the prior art, the following equation holds:

$$\Delta Vo/Vi = gm1 \times (R1 - j \times 1/(\omega C)) \quad (j: \text{imaginary number}) \tag{3}$$

$$\text{Thus, Gain1} = gm1 \times \sqrt{R1^2 + 1/(\omega C)^2} \tag{4}$$

$$\text{Phase1} = \tan^{-1}(-1/(\omega CR1)) \tag{5}$$

Next, in connection with the phase compensation circuit 17 according to the present embodiment, the following equation holds:

$$\Delta Vo/\Delta Vi = gm1 \times ((R1 + S1 \times R2) - j \times S1/(\omega C)) \tag{6}$$

where $S1 = 1/(1 + gm \times R2)$ $$\text{Thus, Gain2} = gm1 \times \sqrt{(R1 + S1 \times R2)^2 + S1^2/(\omega C)^2} \tag{7}$$

$$\text{Phase2} = \tan^{-1}(-S1/(\omega C \times (R1 + S1 \times R2))) \tag{8}$$

The gain Az and zero-point frequency fz concerned with the circuit according to the present embodiment are as follows:

$$Az = gm1 \times R1 + gm1/gm2 \tag{9}$$

$$fz = 1/(2 \times \pi \times C \times (R1 \times (1 + gm1 \times R2) + R2)) \tag{10}$$

Figure 3:
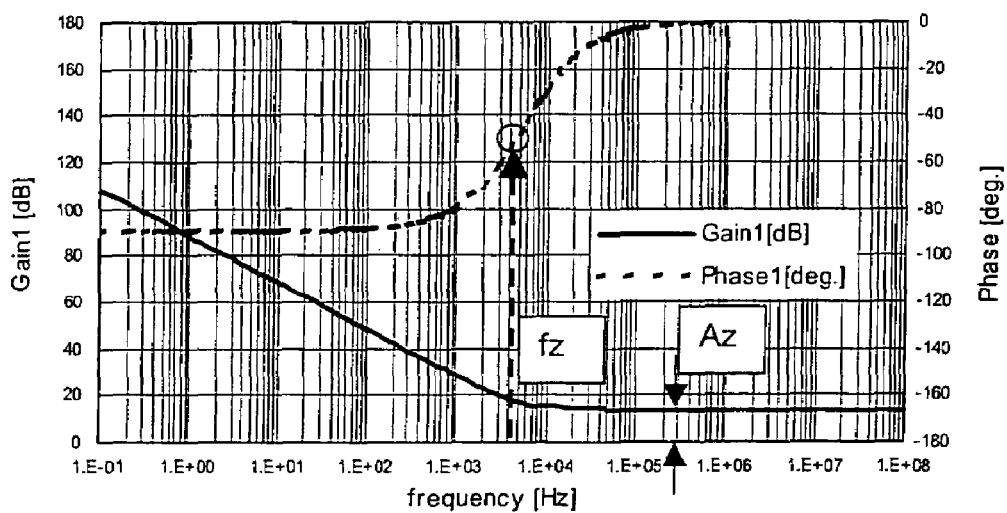
FIG. 3 is a Bode diagram showing the characteristics of an error amplifier connected to the phase compensation circuit shown in FIG. 2.
Figure 4:
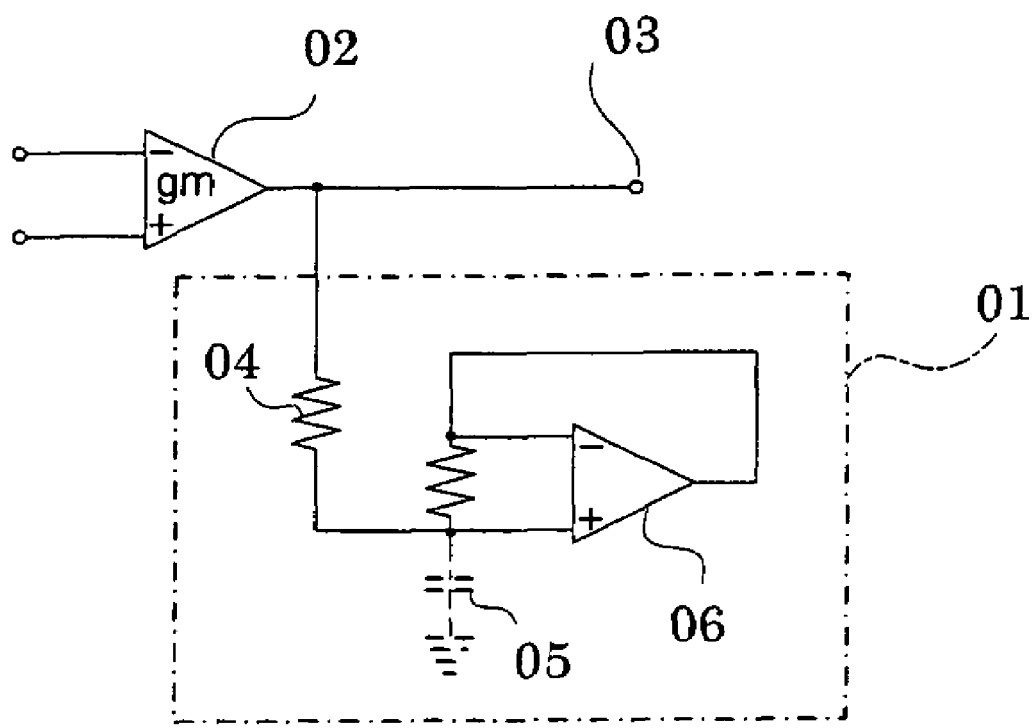
FIG. 4 is a circuit diagram showing another phase compensation circuit according to the prior art.
Figure 6:
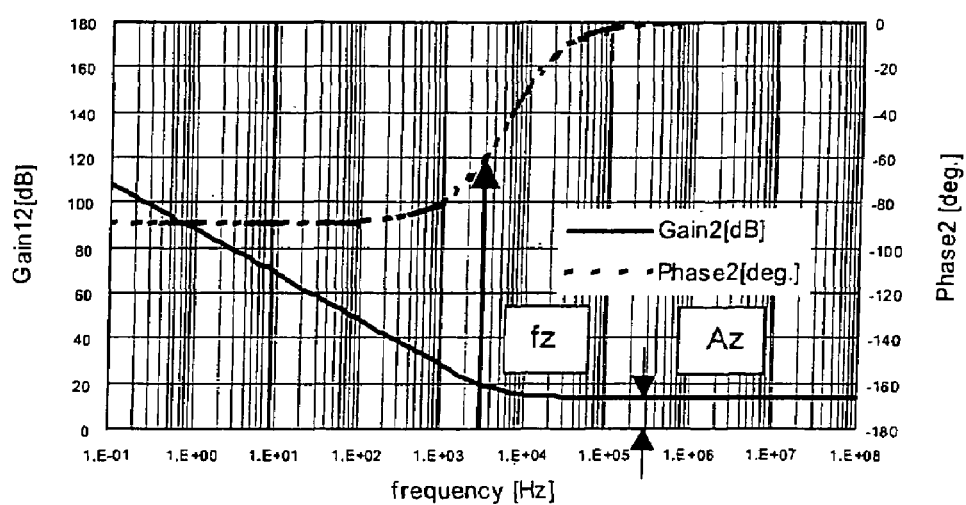
FIG. 6 is a Bode diagram showing the characteristics of an error amplifier connected to the phase compensation circuit shown in FIG. 5.

Based on the above calculation results, Bode diagrams are depicted as in FIG. 3 and FIG. 6. Reference to both drawings clearly shows that the phase compensation circuit 7 according to the prior art and the phase compensation circuit 17 according to the present embodiment are very similar in the phase characteristics having the zero-point frequency fz in the vicinity of 5kHz as well as in the gain Az characteristics.

Figure 1:
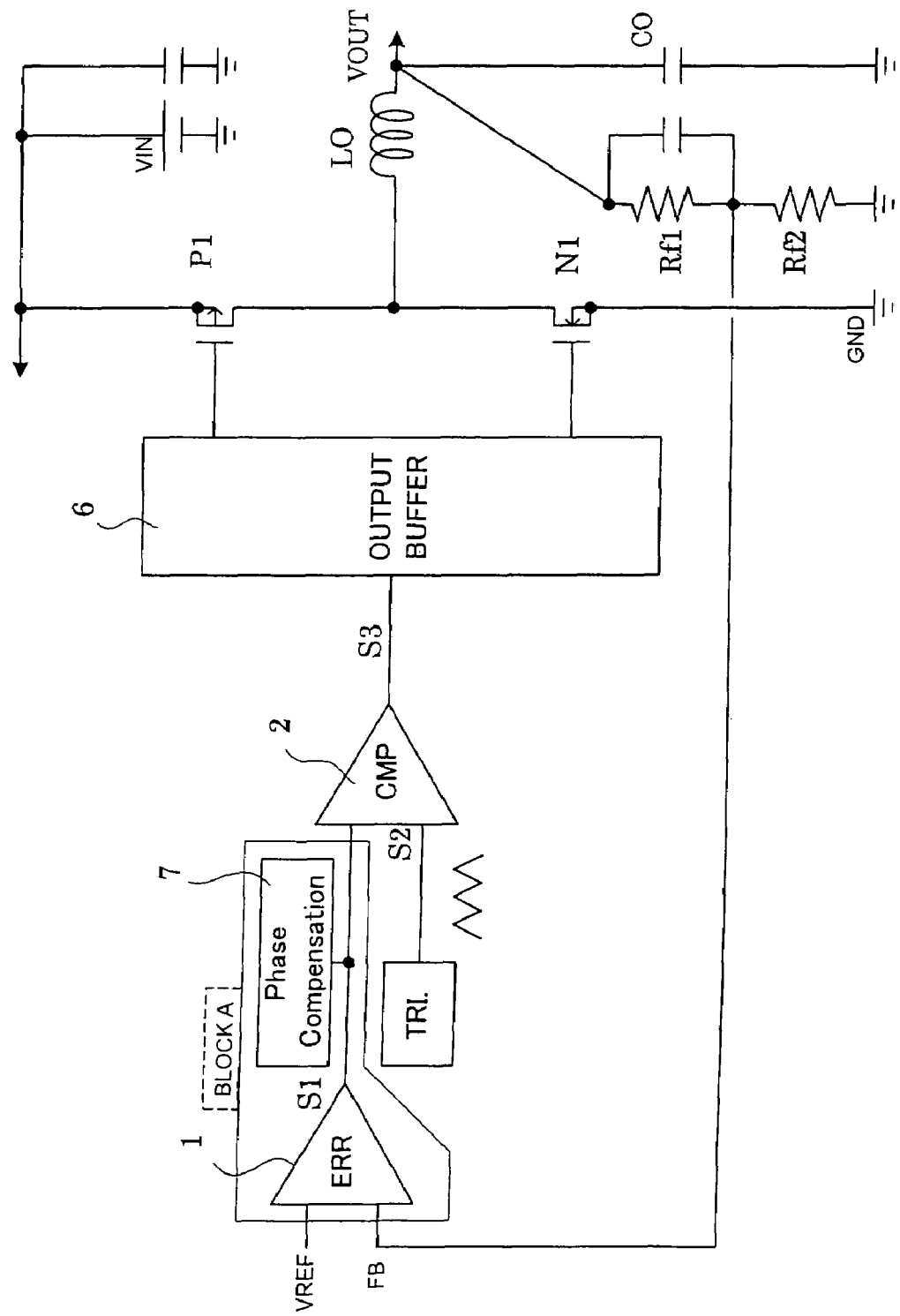
FIG. 1 is a block diagram showing the whole of a step-down DC-DC converter which is a representative power circuit.
Figure 2:
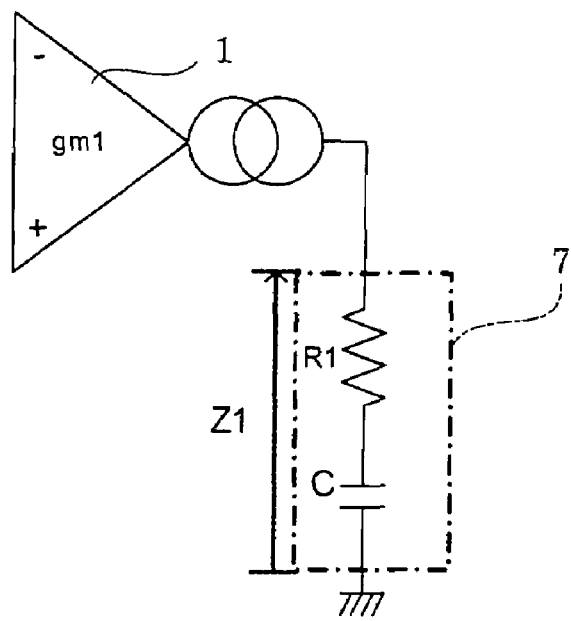
FIG. 2 is a circuit diagram showing a phase compensation circuit according to the prior art.

In the phase compensation circuit 7 shown in FIG. 2, the resistance R1=1 Mohm and the capacitance of the capacitor C=30 pF. In the phase compensation circuit 17, on the other hand, the resistance R1=1 Mohm, the resistance R2=5 Mohm and the capacitance of the capacitor C=3 pF. In short, the capacitance of the capacitor C in the present embodiment is 1/10 of that in the prior art.

According to the present embodiment, as described above, when the error amplifier 1 and the conductance amplifier 18 are combined, AC characteristics appear as if the capacitor C had a larger capacitance value than its essential value. The footprint of the capacitor C can be decreased accordingly. These facts will be discussed below from the viewpoint of the footprint of the capacitor C.

Figure 7A:
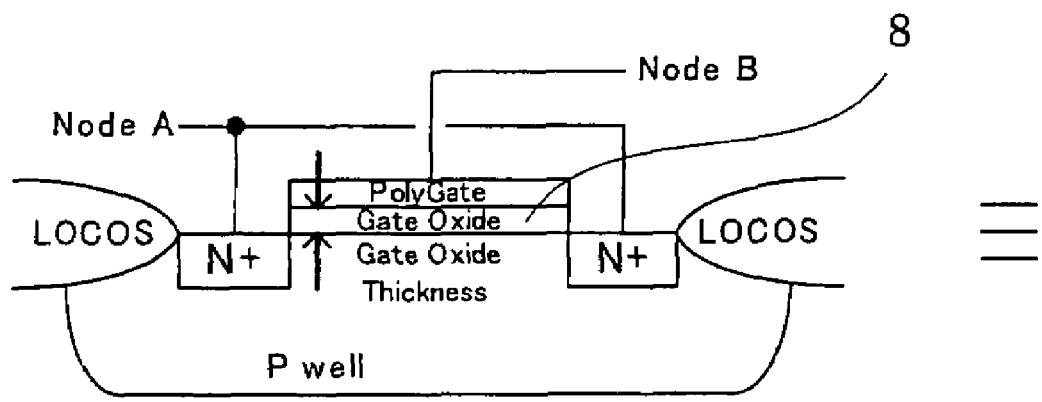
Figure 7B:
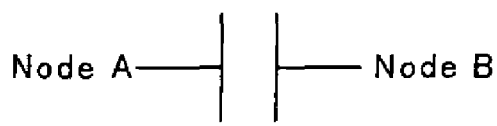

FIGS. 7A and 7B can be provided as showing an example of the layout of capacitance on a silicon substrate using an MOS transistor. FIG. 7A is a schematic view of an NMOS capacitance, and FIG. 7B is a view showing its equivalent circuit. If the film thickness of a Gate oxide film 8 shown in the drawing is 60 nm, for example, the capacitance value per $\mu m\square$ is about 0.55 fF/$\square$, as long as the Gate oxide film 8 is physically $SiO_2$. If an electrostatic capacity of 30 pF in the phase compensation circuit 7 according to the prior art is to be created using the Gate oxide film 8, its area will be:

$$30p[F]/0.551[F/\mu m^2] \approx 54545 [\mu m^2]$$

Thus, an area of about 234 $\mu m\square$ is required.

On the other hand, the area for an electrostatic capacity of 3 pF is considered to be 1/10 of that for 30 pF, and thus turns to be 5,455 [$\mu m^2$], which corresponds to an area of about 74 $\mu m\square$.

Figure 8:
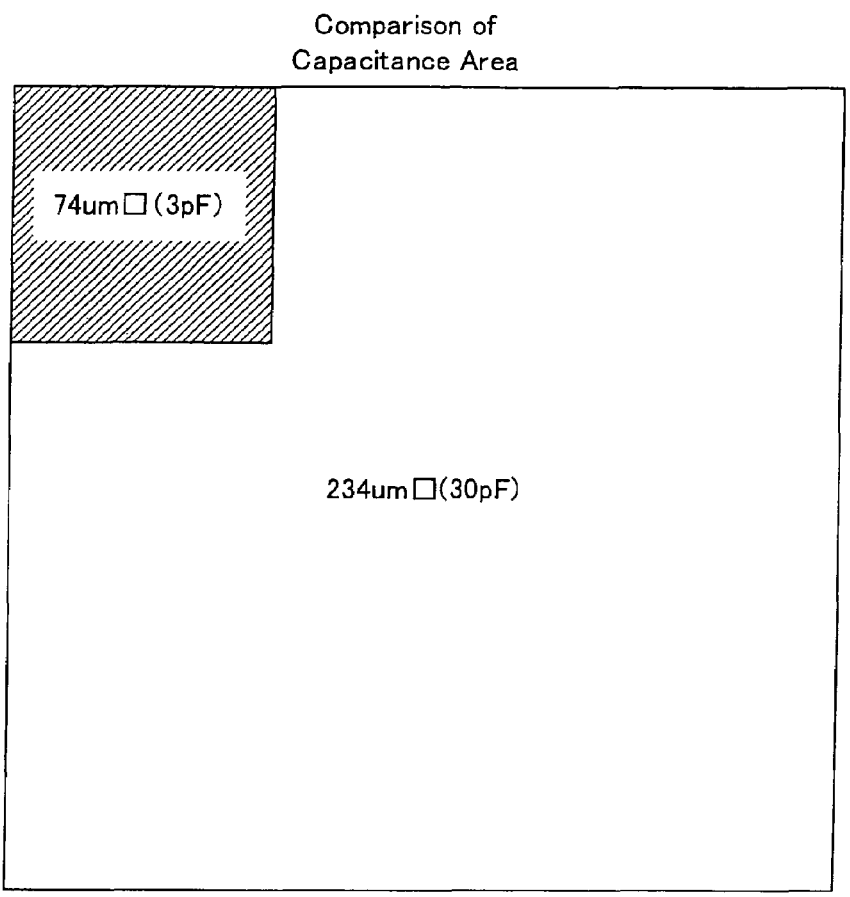
FIG. 8 is an explanation drawing showing the footprint of a capacitor of the phase compensation circuit according to the above-mentioned embodiment in comparison with the prior art.

The area of 234 µm☐ and the area of 74 µm☐, if compared in actual size, will be expressed as shown in FIG. 8.

There is no problem in arranging one conductance amplifier 18 in the surplus area of 30 pF with respect to 3 pF, because the footprint of the conductance amplifier 18, normally, would be not more than the surplus area of 30 pF with respect to 3 pF. Hence, a marked areal advantage in device layout can be obtained by performing capacitance amplification using the conductance amplifier 18 as in the present embodiment.

Next, the following examples illustrate the actualization of the present embodiment with the use of more concrete circuit configurations:

EXAMPLE 1

Figure 9:
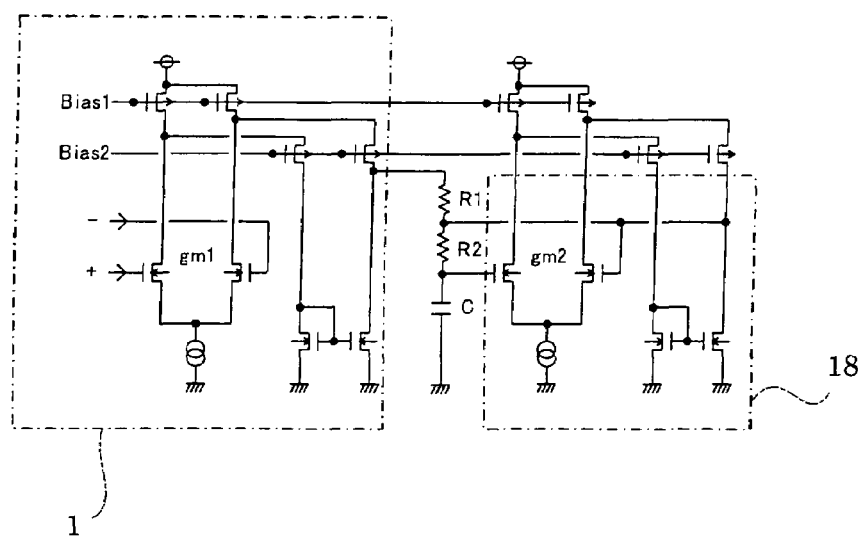
FIG. 9 is a circuit diagram showing the concrete circuit configuration of a phase compensation circuit according to a first example of the present invention.

FIG. 9 is a circuit diagram showing Example 1 of the present invention. In this example, capacitance can be amplified in an AC manner by the conductance amplifier 18. Thus, even when the capacitance of the capacitor C is small, the capacitance essentially required for the phase compensation circuit 17 can be ensured, as stated earlier.

EXAMPLE 2

Figure 10:
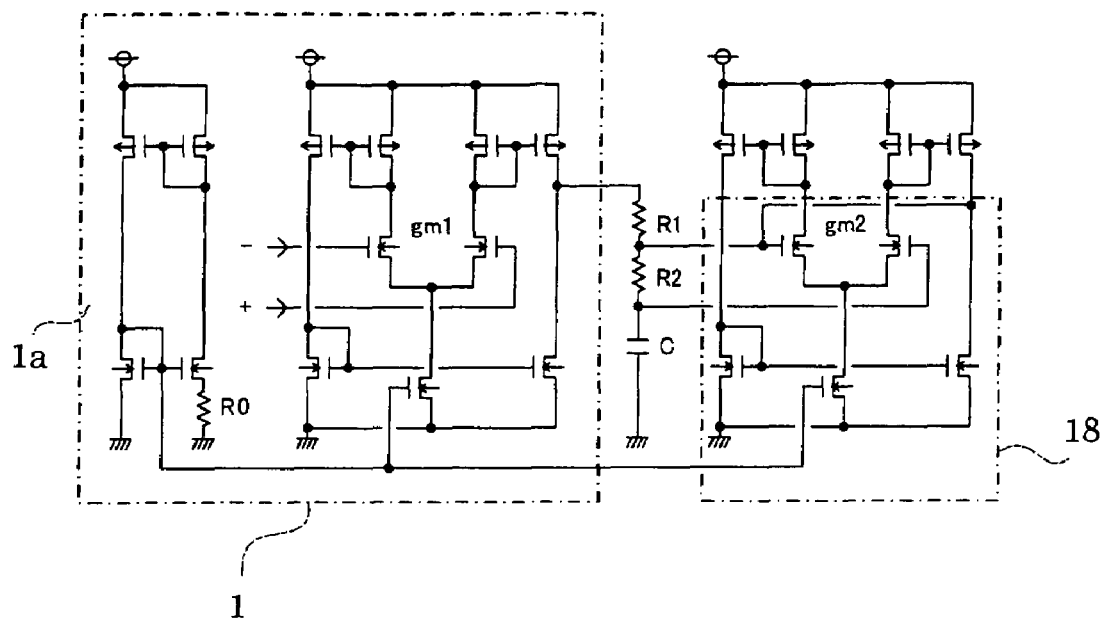
FIG. 10 is a circuit diagram showing the concrete circuit configuration of a phase compensation circuit according to a second example of the present invention.

FIG. 10 is a circuit diagram showing Example 2 of the present invention. In this example, as shown in the drawing, a resistance R0 for defining a bias current is provided in a bias circuit 1a of the error amplifier 1.

In this configuration, the transconductance gm2 of the conductance amplifier 18 can be managed with high accuracy. Thus, the gain Az characteristics in this case can be determined by the ratio between the resistance R0 and the resistance R1, and the size ratio between the transistors constituting the error amplifier 1 and the conductance amplifier 18. The reasons are as follows:

The gain Az in this case is given by the aforementioned equation (9). The transconductances gm1 and gm2 of the equation (9) are given by the following equations (11) and (12):

$$gm1 = \sqrt{(2 \times K2 \times K3)} \times (1/R0) \times (1 - 1/\sqrt{K1}) \qquad (11)$$

$$gm2 = \sqrt{(2 \times K4 \times K5)} \times (1/R0) \times (1 - 1/\sqrt{K1}) \qquad (12)$$

In the equations (11) and (12), K1, K2, K3, K4 and K5 are the transistor constants of the respective transistors shown in FIG. 10.

The transconductances gm1 and gm2 are substituted into the equation (9) representing the gain Az, followed by arrangement, whereby the gain Az can be expressed by the following equation (13):

$$Az = \sqrt{2 \times K2 \times K3} \times (R1/R0) \times (1 - 1/\sqrt{K1}) + \sqrt{(K2 \times K3)/(K4 \times K5)} \qquad (13)$$

The above equation (13) shows that the gain Az can be determined by the ratio between the resistance R0 and the resistance R1, and the size ratio between the transistors constituting the error amplifier 1 and the conductance amplifier 18. This means that according to the present example, stable phase characteristics substantially free from the influence of process variations can be obtained.

EXAMPLE 3

Figure 11:
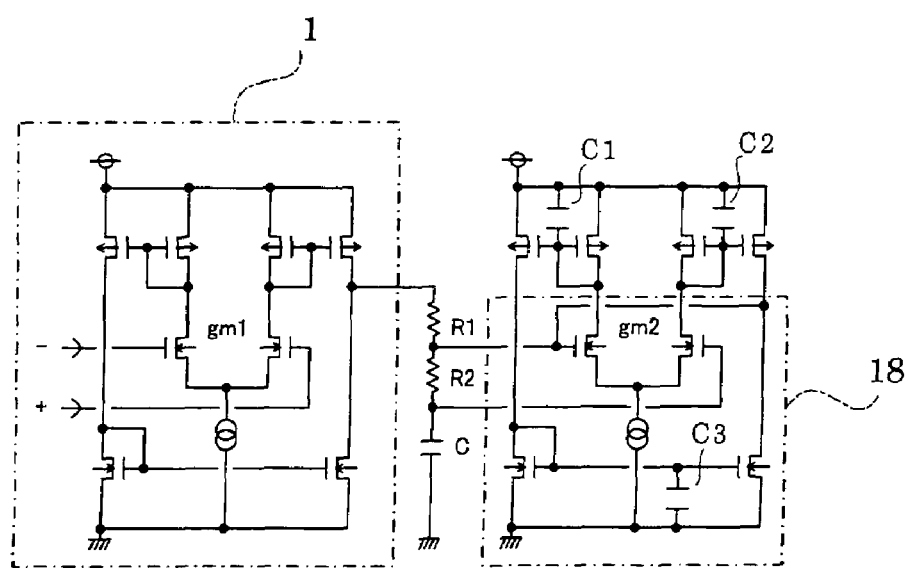
FIG. 11 is a circuit diagram showing the concrete circuit configuration of a phase compensation circuit according to a third example of the present invention.

FIG. 11 is a circuit diagram showing Example 3 of the present invention. In this example, as shown in the drawing, capacitors C1, C2 and C3 are combined with the conductance amplifier 18 in order to increase a phase margin.

Because of this configuration, a great phase margin can be ensured in a region where a phase lag based on the reactance L0 and capacitor C0 for smoothing occurs. Incidentally, if capacitors C1 and C3, each having a capacitance of 5 pF, were provided, the phase margin in the 1 MHz region was improved by 5 degrees or so in comparison with a case where such capacitors were not provided. This frequency region is a region where a secondary pole is produced by the reactance L0 and capacitor C0 constituting the output smoothing circuit of the DC-DC converter, with the result that the phase is rotated to eliminate a phase margin. Thus, a phase return in this region can contribute very effectively to the stable action of the DC-DC converter.

As described above, the present invention can be used in an industrial field for producing electronic equipment, such as a power circuit, which needs to make phase compensation of an error amplifier having a feedback system.

Although the embodiments of the present invention have been described above, the present invention is not limited to these embodiments. It should be understood that such changes, substitutions and alterations can be made therein without departing from the spirit and scope of the invention as defined by the appended claims.

What is claimed is:

1. A phase compensation circuit connected to an output side of an error amplifier, and comprising:
   a first resistor;
   a second resistor;
   a capacitor; and
   a conductance amplifier that receives voltages of both terminals of the second resistor, and includes an output terminal connected to a connecting point between the first resistor and the second resistor,
   wherein the first resistor, the second resistor, and the capacitor are connected to one another in series, and
   wherein a gain of a system including the error amplifier and the phase compensation circuit is defined by a transistor size ratio of transistors constituting the error amplifier to transistors constituting the conductance amplifier, and a resistance ratio of a resistance defining a bias current of the error amplifier to a resistance of the first resistor.

2. A phase compensation circuit connected to an output side of an error amplifier, and comprising:
   a first resistor;
   a second resistor;
   a capacitor; and
   a conductance amplifier that receives voltages of both terminals of the second resistor, and includes an output terminal connected to a connecting point between the first resistor and the second resistor,
   wherein the first resistor, the second resistor, and the capacitor are connected to one another in series,
   wherein a gain of a system including the error amplifier and the phase compensation circuit is defined by a transistor size ratio of transistors constituting the error amplifier to transistors constituting the conductance amplifier, and a resistance ratio of a resistance defining a bias current of the error amplifier to a resistance of the first resistor,
   wherein a second capacitor, a third capacitor, and a fourth capacitor are connected with the conductance amplifier of the phase compensation circuit in order to increase a phase margin of a system including the error amplifier and the phase compensation circuit.

3. A power circuit comprising:
   an error amplifier which gives feedback on a first signal representing an output voltage by comparing the signal with a reference value, which sends out a second signal corresponding to an error between the first signal and the reference value, and which controls an output voltage of the power circuit based on the second signal;

a phase compensation circuit which compensates the phase of the error amplifier, wherein the phase compensation circuit is connected to an output side of the error amplifier, wherein the phase compensation circuit comprises:

a first resistor;

a second resistor;

a capacitor; and a conductance amplifier that receives voltages of both terminals of the second resistor, and includes an output terminal connected to a connecting point between the first resistor and the second resistor, wherein the first resistor, the second resistor, and the capacitor are connected to one another in series, and wherein a gain of a system including the error amplifier and the phase compensation circuit is defined by a transistor size ratio of transistors constituting the error amplifier to transistors constituting the conductance amplifier, and a resistance ratio of a resistance defining a bias current of the error amplifier to a resistance of the first resistor.

4. A power circuit comprising:

an error amplifier which gives feedback on a first signal representing an output voltage by comparing the signal with a reference value, which sends out a second signal corresponding to an error between the first signal and the reference value, and which controls an output voltage of the power circuit based on the second signal;

a phase compensation circuit which compensates the phase of the error amplifier, wherein the phase compensation circuit is connected to an output side of the error amplifier, wherein the phase compensation circuit comprises:

a first resistor;

a second resistor;

a capacitor; and a conductance amplifier that receives voltages of both terminals of the second resistor, and includes an output terminal connected to a connecting point between the first resistor and the second resistor, wherein the first resistor, the second resistor, and the capacitor are connected to one another in series, wherein a gain of a system including the error amplifier and the phase compensation circuit is defined by a transistor size ratio of transistors constituting the error amplifier to transistors constituting the conductance amplifier, and a resistance ratio of a resistance defining a bias current of the error amplifier to a resistance of the first resistor, wherein a second capacitor, a third capacitor, and a fourth capacitor is are connected with the conductance amplifier of the phase compensation circuit in order to increase a phase margin of a system including the error amplifier and the phase compensation circuit.

* * * * *